(12) United States Patent
Cauvin et al.

(10) Patent No.: US 8,691,880 B2
(45) Date of Patent: Apr. 8, 2014

(54) SILICONE DISPERSIONS

(75) Inventors: Severine Cauvin, Mons (BE); Anick Colson, Vedrin (BE); Tatiana Dimitrova, Braine L'Alleud (BE); Jean-Paul Lecomte, Brussels (BE)

(73) Assignee: Dow Corning Corporation, Midland, MI (US)

( * ) Notice: Subject to any disclaimer, the term of this patent is extended or adjusted under 35 U.S.C. 154(b) by 409 days.

(21) Appl. No.: 13/141,546

(22) PCT Filed: Dec. 21, 2009

(86) PCT No.: PCT/EP2009/067634
§ 371 (c)(1),
(2), (4) Date: Sep. 6, 2011

(87) PCT Pub. No.: WO2010/072711
PCT Pub. Date: Jul. 1, 2010

(65) Prior Publication Data
US 2011/0313060 A1    Dec. 22, 2011

(30) Foreign Application Priority Data
Dec. 23, 2008 (GB) .................................. 0823370.2

(51) Int. Cl.
*B01D 19/04* (2006.01)
(52) U.S. Cl.
USPC ........................................... 516/31; 424/401

(58) Field of Classification Search
USPC ............................................. 424/401; 516/31
See application file for complete search history.

(56) References Cited

U.S. PATENT DOCUMENTS 6,060,546 A    5/2000 Powell et al.
6,656,975 B1 * 12/2003 Christiano et al. .............. 516/22

FOREIGN PATENT DOCUMENTS

WO    WO 02/42360 A2    5/2002

OTHER PUBLICATIONS

International Search Report for Application No. PCT/EP2009/067634 dated Mar. 25, 2010, 3 pages.

* cited by examiner

*Primary Examiner* — Margaret Moore
(74) *Attorney, Agent, or Firm* — Howard & Howard Attorneys PLLC

(57) ABSTRACT

A non-aqueous silicone emulsion is provided. It comprises a continuous phase of a polar organic liquid containing droplets of an organopolysiloxane dispersed therein. An organic wax, which has a melting point in the range 40 to 100° C. and is sparingly soluble in the polar organic liquid at 25° C., is dispersed in the polar organic liquid continuous phase as a network of interconnected particles which stabilizes the organopolysiloxane droplets in emulsion in the polar organic liquid. A process for the production of the emulsion is also disclosed.

20 Claims, 2 Drawing Sheets

Interconnected network according to the invention

Dispersed crystals – OUT of the scope of the invention

Emulsion stabilized by the interconnected network of particles.

SILICONE DISPERSIONS

RELATED APPLICATIONS

This application claims priority to and all the advantages of International Patent Application No. PCT/EP2009/067634, filed on Dec. 21, 2009, which claims priority to Great Britain Patent Application No. 0823370.2, filed on Dec. 23, 2008.

CROSS REFERENCE TO RELATED APPLICATIONS

None

TECHNICAL FIELD

This invention relates to silicone dispersions. In particular it relates to non-aqueous emulsions of an organopolysiloxane in a polar organic liquid in which the organopolysiloxane is substantially insoluble.

BACKGROUND

Silicones are used in many products to enhance the products with the benefits of silicones. Such silicones which confer benefits to a composition may be called 'active silicones'. For example, silicones (organopolysiloxanes) are used in many washing products to control foam formation. Silicones are also used in laundry products such as rinse cycle fabric softeners to give a soft feel to fabrics. Silicones are also present in many hair shampoos and other hair care products to enhance the shine and healthy appearance of the hair and are also present in skin care products such as shower gels to enhance the smooth feel of the skin.

Active silicones are often formulated as silicone oil-in-water emulsions comprising droplets of silicone oil dispersed in a continuous aqueous phase. Silicone oil-in-water emulsions require an additive to stabilize the emulsion, that is to prevent the droplets of silicone oil from coalescing into a continuous oil phase. The additives used are surfactants, that is amphiphilic molecules comprising a hydrophobic portion and a hydrophilic portion, as defined in Article 1, point 6 of the EC Directive No 648/2004 of 31 Mar. 2004. The surfactants are generally non-polymeric and may be anionic, cationic, nonionic or amphoteric. Examples of such surfactants suitable for silicon oil-in-water emulsions are given in many published patents, for example in WO-02/42360-A2.

However, surfactants are not acceptable in some applications, for example in certain food, personal care and cosmetics products where the formulation freedom and the choice of surfactants are severely restricted by legislation. Therefore there is a need to develop surfactant-free formulations and to develop stable silicone dispersions which can be mixed into food, personal care and cosmetics products more readily than pure silicones can be mixed.

U.S. Pat. No. 6,656,975 describes a silicone composition having a continuous phase of a polar organic liquid essentially requiring particles of a silicone active material encapsulated within an organic encapsulating material which is a solid at 25° C. Encapsulation is either via a layered core-shell structure of the emulsion or via matrix encapsulation. The silicone active material is sparingly soluble in the polar organic liquid at 25° C. but is substantially dissolved in the polar organic liquid at temperatures of from 40 to 100° C. The three phase contact angle between the organic encapsulating material, the silicone antifoam and the polar organic liquid is below 130°, with the angle measured through the silicone. The process described for making the composition necessitates a hot process in order to ensure that the silicone is encapsulated. However, this restricts the use of this product to silicones which are unaffected by heating. There must also be a surfactant present to ensure the silicone oil is fully encapsulated and furthermore a silicon based cross-linking material, typically a silicone resin as an essential ingredient which is not suitable for use in food related products. Hence, the products of U.S. Pat. No. 6,656,975 cannot be utilised in many food, personal care and cosmetics products.

SUMMARY

A non-aqueous silicone emulsion according to the invention comprises a continuous phase of a polar organic liquid having dispersed therein droplets of an organopolysiloxane, characterized in that an organic wax, which has a melting point in the range 40 to 100° C. and is sparingly soluble in the polar organic liquid at 25° C., is dispersed in the polar organic liquid continuous phase as a network of interconnected particles which stabilises the organopolysiloxane droplets in emulsion in the polar organic liquid.

A process according to the invention for the production of a non-aqueous silicone emulsion comprises
(i) preparing a dispersion of organic wax particles in a polar organic liquid wherein the wax is dispersed in the polar organic liquid continuous phase as a network of interconnected particles, and
(ii) mixing a liquid organopolysiloxane into said dispersion with sufficient shear that the median organopolysiloxane droplet size is less than 0.5 mm.

A non-aqueous silicone emulsion according to the invention obtainable by the following steps:
(i) preparing a dispersion of organic wax particles in a polar organic liquid wherein the wax is dispersed in the polar organic liquid continuous phase as a network of interconnected particles, and
(ii) mixing a liquid organopolysiloxane into said dispersion with sufficient shear that the median organopolysiloxane droplet size is less than 0.5 mm.

In a process according to the invention for the controlled release of a silicone active material from a composition, the silicone active material such as organopolysiloxane is incorporated in a non-aqueous silicone emulsion as defined above, the non-aqueous silicone emulsion is added to the said composition, and the silicone active material is released by heating the composition to a temperature at which the wax is soluble in the polar organic liquid continuous phase. Alternatively the silicone active material is released by shearing the composition to destabilise the emulsion.

A triggerable control release composition comprising a non-aqueous silicone emulsion obtainable by the following steps:
(i) preparing a dispersion of organic wax particles in a polar organic liquid wherein the wax is dispersed in the polar organic liquid continuous phase as a network of interconnected particles, and
(ii) mixing a liquid organopolysiloxane into said dispersion with sufficient shear that the median organopolysiloxane droplet size is less than 0.5 mm.

DETAILED DESCRIPTION

The silicone phase generally comprises a fluid organopolysiloxane composition. The fluid organopolysiloxane composition can for example have a bulk viscosity ranging from 1 to 1,000,000 mm$^2$/s as measured at 25° C. The fluid organopolysiloxane can for example be a substantially linear polydiorganosiloxane, although branched and/or cyclic polysiloxanes can also be emulsified. Linear polyorganosiloxane fluids can be expressed by the general formula $R^1{}_a SiO_{(4-a)/2}$ in which the groups $R^1$ are the same or different monovalent hydrocarbon or halogenated hydrocarbon groups having one to ten carbon atoms and a has a value of 1.9 to 2.2. Specific examples of groups $R^1$ include methyl, hydroxyl, ethyl, propyl, butyl, octyl, trifluoropropyl, phenyl, 2-phenylethyl, 2-phenylpropyl and vinyl groups. The polyorganosiloxane fluid preferably has a viscosity of 20 to 10,000 mm²/s at 25° C. It is particularly preferred that the polyorganosiloxane is a trimethylsilyl-terminated polydimethylsiloxane (PDMS) having a viscosity of about 350 to 1500 mm²/s at 25° C. Alternatively, the polyorganosiloxane may be substituted, branched or cross-linked. The branching may be in the siloxane chain, brought about for example by the presence of some tri-functional siloxane units of the formula $ZSiO_{3/2}$, where Z denotes a hydrocarbon, hydroxyl or hydrocarbonoxy group.

The organopolysiloxane fluid may be a non-reactive fluid, for example a linear polydimethylsiloxane tipped with trimethylsiloxy units, or may be an organopolysiloxane fluid having reactive groups. The silicone usually is a silicone active material intended to impart an advantageous effect of the silicone to a composition. For example polydimethylsiloxane is a useful additive to inhibit foam formation.

The silicone phase can contain an additive to enhance its performance in the final product. For example, antifoams frequently are dispersions of hydrophobic filler in one or a mixture of polysiloxane fluids. In such an antifoam, the hydrophobic filler is preferably silica particles with a surface area of at least 50 m²/g as measured by BET, for example fumed silica, precipitated silica and gel formation silica. Fumed $TiO_2$, $Al_2O_3$, zinc oxide or magnesium oxide are alternative fillers. The average particle size of the filler is preferably from 0.1 to 20 μm, most preferably 0.5 to 5 μm. The surface of the filler is rendered hydrophobic by treatment with treating agents such as reactive silanes or siloxanes, for example, dimethyldichlorosilane, trimethylchlorosilane, hexamethyldisilazane, hydroxyl end-blocked or methyl end-blocked polydimethylsiloxanes, siloxane resins, fatty acids or a mixture of one or more of these. Fillers which have already been treated with such compounds are commercially available, for example from Degussa under the trade mark Sipernat. The surface of the filler may be rendered hydrophobic before or after the addition of the filler to the organopolysiloxane fluid.

The silicone oil phase can be a mixture of two or more organopolysiloxanes. For example the silicone phase can be a solution of a solid organopolysiloxane gum or resin, or of a highly viscous organopolysiloxane gum, in a low viscosity organopolysiloxane fluid. The organopolysiloxane gum can for example have a viscosity of above 100 Pa·s or even above 10000 Pa·s at 25° C. The low viscosity organopolysiloxane fluid can for example have a viscosity in the range 1 to 1000 centiStokes (mm²/s) at 25° C. The low viscosity organopolysiloxane fluid can be a cyclic polydiorganosiloxane such as decamethylcyclopentasiloxane and/or a linear polydiorganosiloxane such as a linear polydimethylsiloxane tipped with trimethylsiloxy units.

A reactive organopolysiloxane fluid can for example contain reactive groups such as hydroxyl (either Si—OH or alcohol groups), amino, vinyl or Si—H groups. The organopolysiloxane fluid can for example be a silanol-terminated polydimethylsiloxane. The reactive organopolysiloxane fluid may be mixed with a non-reactive organopolysiloxane fluid.

The silicone phase is generally present at least 3% by volume of the emulsion and is usually present at least 5%, preferably at least 8%, to allow efficient distribution of the silicone emulsion. The silicone phase can form up to 25% by volume of the emulsion, although concentrations of silicone below 15 or 20% may be preferred as these can more readily be mixed without risk of phase inversion. Better emulsification is achieved if all ingredients have been first poured together in the mixing vessel followed by the agitation of the mixture. Adding either the silicone active or organic phase or both step-wise generally leads to large particle sizes, unstable emulsions or even unsuccessful emulsification.

By the term 'organic' we mean a compound or polymer whose longest chain of atoms comprises at least 50% carbon atoms. The polar organic liquid is an organic liquid which is more polar than polydimethylsiloxane. Examples of suitable polar organic liquids are synthetic polymers whose backbone contains oxygen atoms, and vegetable oils. The polar organic liquid can be a mixture of one or more vegetable oils, or a mixture of one or more synthetic polymers, or a mixture of one or more vegetable oil(s) with one or more organic polymer(s).

One type of preferred polar organic liquid continuous phase comprises a polyether. It can for example be selected from the group consisting of polyethylene glycol, polypropylene glycol, polyoxyethylene (EO) polyoxypropylene (PO) copolymers of either a random or a block type and condensates of any of these with polyols such as glycerol, sorbitol or pentaerythritol. Preferred polyethers have molecular weights of from 100 to 10,000. Preferred polyethers are EO/PO copolymers containing about 50 wt. % or greater PO, for example EO/PO/EO block copolymers. Such block copolymers are available from BASF Corporation under the Trade Mark Pluronic or from Dow Chemical Corporation under the trade name Voranol.

Alternatively the polar organic liquid can comprise a vegetable oil such as rapeseed oil, sunflower oil, soybean oil or corn oil. The oil preferably has a melting point below 20° C. and purity of at least a technical grade. The use of a vegetable oil as the polar organic liquid continuous phase may give wider acceptance in food related uses.

The polar organic liquid continuous phase can comprise a blend of a polyether with a vegetable oil, provided that these are miscible with each other. Polyethers which are high in PO content are miscible with the vegetable oils listed above within wide miscibility limits.

The polar organic liquid continuous phase can include low molecular weight polyglycols, glycols such as propylene glycol or ethylene glycol, or alcohols. These lower molecular weight polar organic liquids act as diluents or viscosity modifiers and may be used for example at up to 60% by volume, preferably up to 40%, for example at 1-20%. Less polar organic liquids such as petroleum distillates can also be used as diluents/viscosity modifiers if they are miscible with or soluble in the continuous phase.

The organic wax is a solid material which is sparingly soluble in the polar organic liquid at 25° C. The organic wax generally has a solubility at 25° C. of below 50 g/L and preferably below 10 g/L in the polar organic liquid, and preferably has a melting point of 40-100° C. The organic wax preferably is substantially dissolved in the polar organic liquid at a temperature above its melting point and in the range 40-100° C. Most preferably the solid organic wax is crystalline.

For the desired slow release of the silicone active material, the solid organic network-forming material is preferably only moderately or sparingly soluble or slowly dissolving in the medium in which the silicone emulsion of the invention is to be used. The organic wax should preferably be at least moderately wettable by the silicone active material within the polar organic liquid continuous phase.

Examples of suitable organic waxes include fatty acid triglycerides. Suitable triglycerides are sold by Croda under the trade marks 'Crestaflex' and 'Crestaflake 262.'

The amount of wax present in the non-aqueous silicone emulsion is generally at least 0.3% by weight, preferably at least 0.5%, and may be up to 15 or 20%. Wax concentrations of 1 to 10% by weight of the non-aqueous emulsion are preferred.

In the process of the invention, a dispersion of organic wax particles in a polar organic liquid is prepared. The wax is dispersed in the polar organic liquid continuous phase as a network of interconnected particles. Such a dispersion can be prepared in various ways. A liquid organopolysiloxane is then mixed into said dispersion with sufficient shear that the median organopolysiloxane droplet size is less than 0.5 mm.

The dispersion of wax in the polar organic liquid continuous phase as a network of interconnected particles can for example be formed by dispersing the wax in the polar organic liquid and heating until a clear solution is obtained. In one preferred procedure the solution is then rapidly cooled, which results in the formation of tiny wax crystals in the polar organic liquids. With increasing crystal formation, crystals will eventually interlock into macroscopic structures. The wax precipitate may be in the form of stacked lamella crystals which can fall into random "house of cards" structures that trap liquid oil, effectively forming an organic gel. The suspension of a network of interconnected wax particles in the polar organic liquid continuous phase exhibits elastic-solid behaviour: this transition from viscous to elastic-solid behaviour is often referred to as gelation. The crystallisation step leads to a shear thinning material having considerable yield stress and elasticity. These properties can be measured employing a stress-strain rheometer in flow and oscillation respectively. It may also be possible to see the network of interconnected wax particles by microphotography.

The cooling of the solution of the wax in the polar organic liquid should be sufficient to cool the solution to a temperature below the melting point of the wax. One convenient cooling method is quenching by adding cold polar organic liquid.

In a second preferred procedure a crystal habit modifier is added in the polar organic oil along with the organic wax, followed by heating until a clear solution is obtain. The clear solution is then cooled down under agitation. One preferred type of crystal habit modifier is a hydrophobic silicaceous material. An example of a hydrophobic silicaceous material which can act as crystal habit modifier is a branched silicone resin containing monovalent tri-hydrocarbonsiloxy (M) groups of the formula $R_3SiO_{1/2}$ and tetrafunctional (Q) groups $SiO_{4/2}$ or trivalent hydrocarbonsilsesquioxy (T) $RSiO_{3/2}$ groups, wherein R denotes a monovalent hydrocarbon group, preferably methyl. A preferred silicone resin is a methyl MQ resin in which the molar ratio of $(CH_3)_3Si\ O_{1/2}$ to $SiO_2$ units is from 0.4:1 to 1.2:1. The silicone resin is preferably a solid resin and can be present as an insoluble filler or may be wholly or partially soluble in an appropriate solvent which needs to be miscible in the polar organic liquid. The amount of branched silicone resin used is preferably at least 0.5% by weight, for example 0.5 to 5%, based on the polar organic oil.

The addition of a crystal habit modifier such as a branched silicone resin changes the size of the crystals, which is observed by the making of organic gel as aforementioned. In the absence of either a rapid cooling process or a crystal habit modifier, large wax crystals are obtained. No gel is observed. Such large wax crystals do not form a network of interconnected particles and do not stabilise a non-aqueous silicone emulsion.

The liquid organopolysiloxane is mixed into the dispersion of wax as a network of interconnected particles in the polar organic liquid continuous phase under moderate shear. Preferably the organopolysiloxane is added to the wax dispersion while mixing with sufficient shear that the median organopolysiloxane droplet size is reduced to less than 0.5 mm. The shear applied during mixing should not be so high that it raises the temperature of the dispersion to above the melting point of the wax. We have found that a simple propeller mixer provides moderate but adequate shear, as does a dental mixer designed to deal with thick pastes.

The non-aqueous silicone emulsions of the invention are stable, showing no phase separation, which would be witnessed by appearance of layers in the container. They also show no gravitational segregation, which would be witnessed by appearance of layers in the container or by inhomogeneous vertical distribution of the silicone. The emulsions show no substantial change over time in the size distribution of the dispersed phase. The emulsions remain stable when diluted with the polar organic liquid continuous phase. For example, an emulsion containing 3% by weight organic wax does not exhibit coalescence when diluted with the polar organic liquid, even down to a final concentration of wax of 1%.

The non-aqueous silicone emulsions of the invention are effective formulations for introducing an active silicone in uses where surfactants are not acceptable. For example, the active silicone can be an antifoam. An antifoam according to the invention can be used in food processing, for example to inhibit foam during potato peeling and cutting, and in fermentation, and in dishwashing.

For most effective use of an active silicone, it is an advantage to have controlled release, that is to be able to trigger the release of the active silicone at the right moment of time during its use. The non-aqueous silicone emulsions of the invention can achieve this by causing a physical change in the organic wax so that it is no longer stabilizing the silicone in emulsion.

In a further embodiment of the present invention there is provided a triggerable control release composition comprising a non-aqueous silicone emulsion obtainable by the following steps:
(i) preparing a dispersion of organic wax particles in a polar organic liquid wherein the wax is dispersed in the polar organic liquid continuous phase as a network of interconnected particles, and
(ii) mixing a liquid organopolysiloxane into said dispersion with sufficient shear that the median organopolysiloxane droplet size is less than 0.5 mm.

It will be appreciated that the composition described in U.S. Pat. No. 6,656,975 and particularly the examples therein do not provide a triggerable control release, particularly with regard to temperature as they are used at around room temperature.

The release of the liquid organopolysiloxane is preferably triggerable by either:
(a) heating the composition to a temperature above the melting point of the wax; or
(b) subjecting the composition to a shear significantly greater, than the shear in step (ii) used to emulsify the silicone.

One preferred method of triggering controlled release of an active silicone is by heating the non-aqueous silicone emulsion, or a composition containing it, to a temperature above the melting point of the wax. The wax is then no longer present as a network of particles. This method is generally effective, and is particularly effective when the wax dissolves in the polar organic liquid continuous phase at temperatures above its melting point.

Another suitable method of triggering controlled release of an active silicone is by subjecting the non-aqueous silicone emulsion to high shear, particularly turbulent shear, which is much higher than the shear used to emulsify the silicone. Such high shear causes shear disintegration of the network of interconnected wax particles and thus destabilises the emulsion. It has been seen that subjecting the emulsion obtained as described above to a high speed turbulent shear (e.g. 1 minute agitation by means of a Rotor-stator homogenizer UltraTurrax by IKA) leads to the destruction of the said emulsion and therefore release of the active. Therefore a sufficiently high, turbulent shear could also be a trigger for the active release. The simultaneous application of both mechanical and temperature triggers is also in the scope of the present invention.

BRIEF DESCRIPTION OF THE DRAWINGS

The invention will now be described with reference to the accompanying Figures, of which

All photos are taken in transmitted illumination and the samples were diluted to increase the clarity of the images. Non-diluted samples are not useful for illustration as the photos are overcrowded and very few features remain visible. However the network of wax particles is less interconnected in the diluted emulsion than at higher concentrations.

Figure 1:
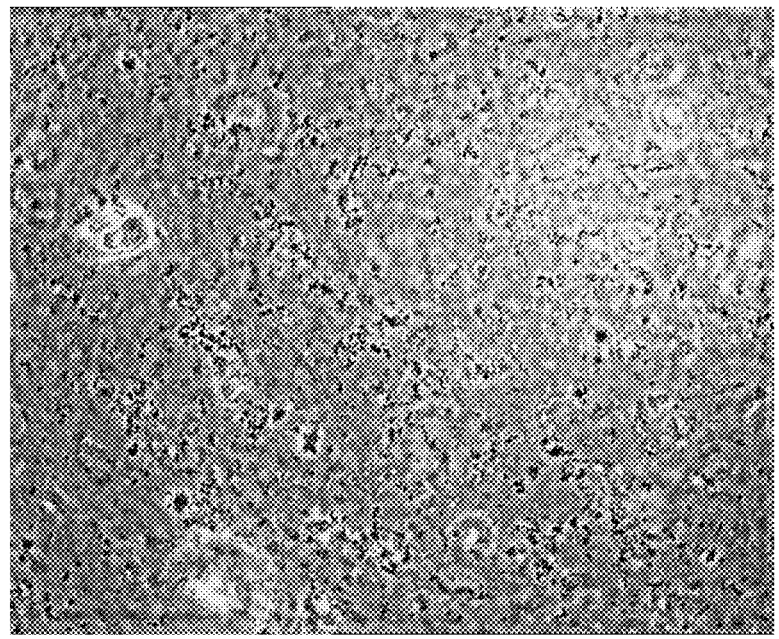
FIG. 1 is a photomicrograph of a dispersion of a triglyceride wax in a polyoxyethylene polyoxypropylene copolymer polar organic liquid continuous phase as a network of interconnected particles.
Figure 2:
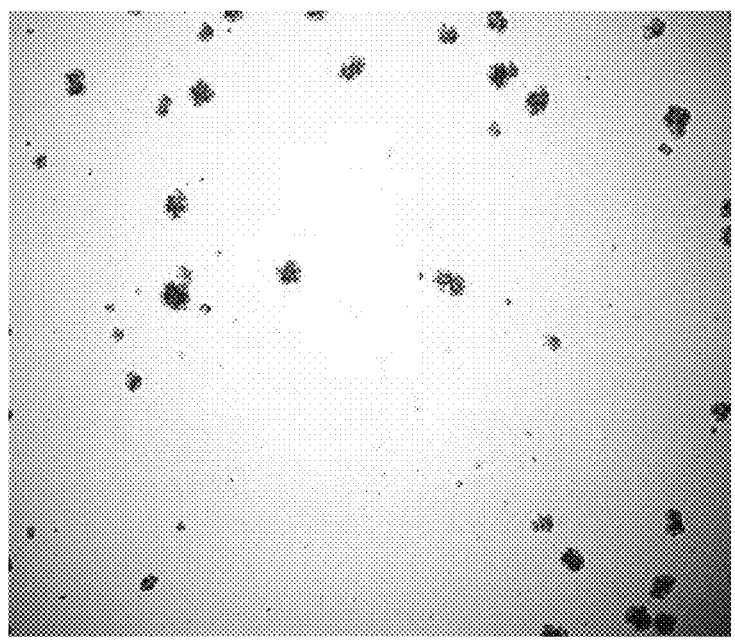
FIG. 2 is a photomicrograph of the same triglyceride wax in a polyoxyethylene polyoxypropylene copolymer, prepared by simple mixing, i.e. not according to the present invention
Figure 3:
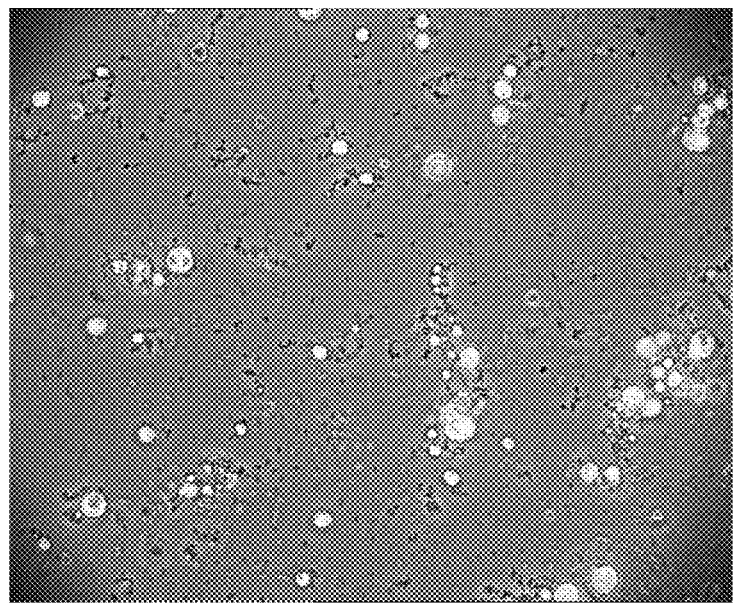
FIG. 3 is a photomicrograph of a non-aqueous emulsion of polydimethylsiloxane as disperse phase in the dispersion of wax in polar organic liquid of FIG. 1 as continuous phase.

The wax particles 1 can be seen in FIG. 1 to form a network of interconnected particles in the polar organic liquid continuous phase. This network of interconnected wax particles 1 is also seen in FIG. 2, where it stabilizes the droplets 2 of polydimethylsiloxane in emulsion.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise. Parts and percentages are by weight unless indicated otherwise.

Preparation A 100 grams of Crestaflake® 262 wax were dissolved at 80° C. in 200 grams polyoxyethylene polyoxypropylene copolymer commercially available under the trade mark Pluronic 6100. The mixture was rapidly cooled by adding 700 grams of Pluronic at 0° C. under vigorous stirring in an Ultraturrax® T25 rotor and stator mixer for 30 seconds at 13000 rpm to form a gel-like dispersion of a network of interconnected wax particles.

Preparation a was Characterised by Rheology Measurements of the Storage modulus, G' and the loss modulus, G" at different frequencies of deformation. Alternatively they are called elastic and plastic modulus respectively, and are measured using a CarryMed Stress-strain rheometer from TA Instruments for standard oscillation measurement routine for stress-strain rheometer. A person skilled in the art would know how to perform these measurements. The results are shown in Table 1 below.

G' and G" were also measured at different temperatures using a fixed oscillatory frequency of 1 Hz during a temperature sweep. These results are also shown in Table 1

TABLE 1

PREPARATION A

| Frequency (Rad/s), T = 25 C. | G' [Pa], T = 25 C. | G" [Pa], T = 25 C. | Temperature [C.] F = 1 Hz | G' [Pa], F = 1 Hz | G" [Pa], F = 1 Hz |
| --- | --- | --- | --- | --- | --- |
| 100 | 3320 | 18000 | 25 | 17500 | 2970 |
| 68.13 | 3260 | 16800 | 26.6 | 14000 | 2620 |
| 46.42 | 3110 | 16000 | 28.2 | 12700 | 2540 |
| 31.62 | 3130 | 15400 | 29.8 | 10900 | 2470 |
| 21.54 | 3090 | 15000 | 31.4 | 8910 | 2520 |
| 14.68 | 3020 | 14400 | 32.9 | 8810 | 1960 |
| 10 | 3020 | 13900 | 34.5 | 8090 | 1870 |
| 6.813 | 3040 | 13500 | 36 | 7510 | 1600 |
| 4.642 | 3080 | 12900 | 37.6 | 6910 | 2090 |
| 3.162 | 3070 | 12700 | 39.1 | 7060 | 1910 |
| 2.154 | 3280 | 12200 | 40.7 | 6550 | 2040 |
| 1.468 | 3230 | 12000 | 42.2 | 5510 | 2350 |
| 1 | 3230 | 11900 | 43.8 | 5060 | 2330 |
| 0.6813 | 3250 | 11700 | 45.3 | 3870 | 2430 |
| 0.4642 | 3250 | 11700 | 46.9 | 2730 | 2240 |
| 0.3162 | 3300 | 11700 | 48.4 | 2090 | 2010 |
| 0.2154 | 3280 | 11900 | 50 | 1020 | 1440 |
| 0.1468 | 3280 | 12200 | 51.5 | 564 | 1010 |
| 0.1 | 3320 | 12500 | 53.1 | 663 | 1070 |
| 0.06813 | 3390 | 12500 | 54.6 | 539 | 920 |
| 0.04642 | 3540 | 12300 | 56.2 | 321 | 650 |
| 0.03162 | 3860 | 11500 | 57.7 | 287 | 548 |
| | | | 59.3 | 168 | 352 |
| | | | 60.8 | 124 | 240 |
| | | | 62.4 | 81.5 | 140 |
| | | | 63.9 | 9.79 | 31.5 |
| | | | 65.5 | 0.67 | 5.58 |
| | | | 67 | 0 | 0.869 |
| | | | 68.6 | 0 | 0.44 |
| | | | 70.1 | 0 | 0.337 |

The formation of a network is shown by the fact that G' is much larger than G" over a broad frequency range.

The results obtained at different temperatures indicate that G' becomes smaller than G" at higher temperatures, with a crossover point at about 50° C. The existence of a G'/G" crossover indicates disintegration of the network of wax particles at higher temperature. This indicates the possibility of using temperature to liberate a silicone active from an emulsion in the wax dispersion.

Preparation B 100 grams of Crestaflake® 262 wax were dissolved at 80° C. in 200 grams rapeseed oil. The mixture was rapidly cooled by adding 700 grams of rapeseed oil cooled to −15° C. under vigorous stirring as described for Preparation A. A gel-like dispersion of a network of interconnected wax particles was formed.

Example 1

A silicone antifoam comprising a dispersion of hydrophobic silica in polydimethylsiloxane and sold under the trade mark Dow Corning DC1500 was added to preparation A in the proportions shown in Table 2 below. The resulting composition was mixed for 20 seconds using a DAC 400FV dental mixer operated at 20000 rpm. An emulsion was formed without visible phase separation.

Examples 2 to 5

Preparation A was diluted with Pluronic® 6100 polyether in proportions shown in Table 2. Silicone antifoam was added to the diluted Preparation A and mixed to form an emulsion as described in Example 1. In each case an emulsion was formed without visible phase separation, although there was some creaming of the emulsion of Example 3.

TABLE 2

| EXAMPLE | % Silicone Antifoam | % Preparation A | % Pluronic® 6100 added in dilution | TOTAL |
|---|---|---|---|---|
| 1 | 10.0 | 90.0 | 0.00 | 100.00 |
| 2 | 10.00 | 47.52 | 42.49 | 100.00 |
| 3 | 10.91 | 22.77 | 66.32 | 100.00 |
| 4 | 10.17 | 6.98 | 82.85 | 100.00 |
| 5 | 10.22 | 60.09 | 29.69 | 100.00 |

Example 6

A commercial polydimethylsiloxane (PDMS) available from Dow Corning under the name Dow Corning® 200 fluid with the specification of viscosity 1000 cSt (mm$^2$/s) at 25° C. was added to preparation A in the proportions shown in Table 3 below and mixed to form an emulsion as described in Example 1. An emulsion was formed without visible phase separation.

Examples 7 to 9

Preparation A was diluted with Pluronic® 6100 polyether in proportions shown in Table 3. Dow Corning® 200 fluid of viscosity 1000 cSt (mm$^2$/s) at 25° C. was added to the diluted Preparation A and mixed to form an emulsion as described in Example 1. In each case an emulsion was formed without visible phase separation.

TABLE 3

| Example | % PDMS 1000 cst | % Preparation A | % Pluronic® 6100 added in dilution | Total |
|---|---|---|---|---|
| 6 | 10.07 | 89.93 | 0.00 | 100.00 |
| 7 | 10.16 | 59.79 | 30.05 | 100.00 |
| 8 | 10.00 | 40.07 | 49.93 | 100.00 |
| 9 | 10.40 | 19.87 | 69.74 | 100.00 |

Example 10

Dow Corning DC1500 silicone antifoam was added to preparation B in the proportions shown in Table 4 below. The resulting composition was mixed for 20 seconds using a DAC 400FV mixer operated at 20000 rpm. An emulsion was formed without visible phase separation.

Examples 11 to 13

Preparation B was diluted with rapeseed oil in proportions shown in Table 4. Silicone antifoam was added to the diluted Preparation B and mixed to form an emulsion as described in Example 10. In each case an emulsion was formed without visible phase separation.

TABLE 4

| Example | % Silicone Antifoam | % PREPARATION B | % RAPESEED oil | Total |
|---|---|---|---|---|
| 10 | 10.95 | 90 | 0 | 100.00 |
| 11 | 10.64 | 60.02 | 30.04 | 100.00 |
| 12 | 10.6 | 30.41 | 59.99 | 100.00 |
| 13 | 10.62 | 10.19 | 80.03 | 100.00 |

The particle size of each of the emulsions of Examples 1-3, 5 and 10-13 was determined using computer assisted image analysis. Microscopy pictures of formulations diluted to 1% silicone in Pluronic® 6100 were taken in transmitted illumination using a standard Zeiss Axioplan microscope. These images were processed using Visilog 6.2 software to reconstruct the size distributions on the basis of at least 400 counted droplets. The size distribution is recorded in Table 5 below by the median particle size by weight d(0.5) and the particle size of the tenth largest percentile d(0.1) and ninetieth largest percentile d(0.9).

The particle size of each emulsion was measured in this way on the day of production and several times thereafter during storage of the emulsion for about a year. The results are listed in Table 5 below. The accuracy of the determination is about 8-10% of the values listed.

TABLE 5

| Time (days) | d(0.1) μm | d(0.5) μm | d(0.9) μm |
|---|---|---|---|
| EXAMPLE 1 | | | |
| 0 | 5.000 | 9.000 | 15.000 |
| 8 | 4.600 | 7.200 | 11.400 |
| 12 | 4.800 | 8.200 | 12.800 |
| 16 | 5.220 | 12.600 | 18.480 |
| 35 | 5.400 | 9.800 | 15.600 |
| 70 | 5.870 | 10.480 | 25.560 |
| 70 | 5.240 | 9.640 | 27.240 |
| 140 | 5.370 | 9.450 | 14.330 |
| 191 | 5.399 | 9.613 | 16.762 |
| 360 | 5.300 | 9.450 | 15.26 |
| EXAMPLE 2 | | | |
| 0 | 6.800 | 11.000 | 25.800 |
| 3 | 7.900 | 15.100 | 25.400 |
| 6 | 7.880 | 17.200 | 30.700 |
| 25 | 9.530 | 20.900 | 37.000 |
| 35 | 8.420 | 16.420 | 26.100 |
| 70 | 8.591 | 16.093 | 25.790 |
| 140 | 7.415 | 14.395 | 21.446 |
| 182 | 7.884 | 15.729 | 26.785 |
| 370 | 7.594 | 15.126 | 21.407 |
| EXAMPLE 3 | | | |
| 0 | 16.800 | 32.000 | 51.000 |
| 3 | 9.200 | 21.000 | 36.400 |
| 6 | 14.370 | 26.620 | 40.560 |
| 25 | 13.730 | 21.000 | 37.250 |
| 35 | 14.190 | 25.950 | 44.600 |
| 70 | 12.649 | 21.795 | 30.445 |
| 140 | 12.721 | 24.522 | 60.413 |
| 182 | 13.585 | 22.461 | 32.895 |
| 370.000 | 12.549 | 22.142 | 30.982 |
| EXAMPLE 5 | | | |
| 0 | 6.500 | 12.200 | 19.200 |
| 3 | 6.430 | 12.860 | 24.860 |
| 22 | 6.500 | 13.400 | 23.000 |
| 35 | 6.620 | 13.020 | 21.000 |
| 70 | 7.456 | 14.302 | 25.159 |
| 140 | 7.068 | 12.841 | 18.976 |
| 179 | 6.849 | 12.572 | 18.397 |
| 370 | 5.584 | 10.438 | 17.386 |
| EXAMPLE 10 | | | |

TABLE 5-continued

| Time (days) | d(0.1) μm | d(0.5) μm | d(0.9) μm |
|---|---|---|---|
| 0 | 4.00 | 7.60 | 15.50 |
| 1 | 3.48 | 6.09 | 9.78 |
| 20 | 3.60 | 5.90 | 10.70 |
| 35 | 3.04 | 6.09 | 9.57 |
| 70 | 4.55 | 8.05 | 13.26 |
| 183 | 5.05 | 10.50 | 30.87 |
| 360 | 4.50 | 7.40 | 11.24 |
| EXAMPLE 11 | | | |
| 0 | 5.20 | 11.40 | 18.80 |
| 1 | 4.38 | 9.58 | 18.13 |
| 20 | 4.90 | 10.40 | 16.50 |
| 35 | 5.42 | 12.08 | 17.80 |
| 70 | 5.92 | 10.09 | 17.70 |
| 183 | 4.01 | 7.89 | 14.11 |
| 360 | 5.53 | 9.69 | 15.27 |
| EXAMPLE 12 | | | |
| 0 | 6.50 | 16.60 | 41.00 |
| 1 | 9.47 | 28.42 | 45.47 |
| 20 | 5.90 | 19.70 | 39.30 |
| 35 | 7.37 | 17.20 | 32.35 |
| 70 | 6.39 | 14.19 | 27.53 |
| 183 | 6.48 | 13.57 | 48.55 |
| 360 | 7.36 | 15.06 | 27.36 |
| EXAMPLE 13 | | | |
| 0 | 8.60 | 28.40 | 54.00 |
| 1 | 9.83 | 28.30 | 45.20 |
| 20 | 9.03 | 35.10 | 42.10 |
| 35 | 9.52 | 23.59 | 48.81 |
| 70 | 12.91 | 57.24 | 81.59 |
| 183 | 8.07 | 20.61 | 42.01 |
| 360 | 9.60 | 26.96 | 50.97 |

It can be seen from Table 5 that all of the emulsions measured were substantially stable over time, that is the particle size of the emulsified silicone droplets did not change substantially over time.

Examples 14 to 16

Preparation A was diluted with a mixture of Pluronic® 6100 polyether and rapeseed oil in proportions shown in Table 6 below. Silicone antifoam was added to the diluted Preparation A and mixed to form an emulsion as described in Example 1. In each case an emulsion was formed without visible phase separation. The particle size of each emulsion was measured as described above and d(0.5) and d(0.9) are recorded in Table 6

TABLE 6

| Example | AF1500 (%) | Preparation A (%) | Pluronic ® 6100 (%) | Rapeseed oil (%) | D(0.5) [μm] | D(0.9) [μm] |
|---|---|---|---|---|---|---|
| 14 | 10.3 | 29.9 | 39.9 | 20.0 | 11.26 | 19.49 |
| 15 | 10.2 | 30.0 | 20.1 | 39.8 | 11.41 | 17.96 |
| 16 | 10.3 | 29.9 | 0.0 | 59.8 | 14.78 | 30.44 |

Foaming tests were carried out on some of the non-aqueous emulsions prepared in the above Examples, and also on the materials used to prepare the emulsions. The procedure was as follows: 100 ml of surfactant solution (1 wt. % linear alkyl sulphonate in distilled water) were introduced in a 250 ml bottle which was fitted to a mechanical shaker. 0.1 mL of the antifoam under test was added to the foaming media. The bottle was tightly closed, then shaken successively four or five cycles, 60 seconds each. The shaker was a Burrell Wrist-Action Shaker used with maximum shake amplitude (setting 10/18 degrees) at 400 strokes/minute. The bottle was clamped at a distance (taken from the centre of the bottle) of 13.3 cm from the shaker shaft. After each shake cycle the initial foam level was recorded, and the time for the foam to collapse to 50% of the volume above the solution (collapse time) was also recorded. If collapse was not achieved after 120 seconds, the next cycle was performed or the experiment stopped. Due to the size of the bottle the maximal amount of foam which can be observed is 100 mL. The results are shown in Table 7 below.

The foaming tests were carried out at various temperatures. For the tests performed at elevated temperature the bottles with the foaming media were placed in an oven until the temperature of the foaming media reached the desired temperature. Then the antifoam under test was added and the experiment was performed as described above. Some cooling of the foam media is inevitable under these conditions; the temperatures quoted below are the temperature immediately before the addition of the antifoam.

The non-aqueous silicone antifoam emulsions according to the invention which were tested were:

Test 2—100 μL emulsion of Example 1 which had been aged for a year, tested at 23° C.;
Test 3—100 μL emulsion of Example 1 which had been aged for a year, tested at 75° C.;
Test 4—100 μL fresh emulsion of Example 1, tested at 23° C.;
Test 5—100 μL fresh emulsion of Example 1, tested at 40° C.;
Test 6—100 μL fresh emulsion of Example 1, tested at 63° C.;
Test 7—100 μL fresh emulsion of Example 1, tested at 75° C.;
Test 12—100 μL fresh emulsion of Example 10, tested at 75° C.;
Test 13—100 μL fresh emulsion of Example 12, tested at 75° C.;
Test 14—100 μL fresh emulsion of Example 5, tested at 75° C.

The materials used for comparison in the foaming tests were:

Test 1—10 μL Dow Corning DC1500 silicone antifoam, tested at 23° C.;
Test 8—10 μL Dow Corning DC1500 silicone antifoam plus 80 μL 'Pluronic® 6100' polyether polar organic liquid, emulsified together in 50 μL water and tested at 75° C.;
Test 9—10 μL Dow Corning® DC1500 silicone antifoam emulsified in 50 μL water and tested at 75° C.;
Test 10—80 μL 'Pluronic® 6100' polyether, tested at 75° C.;
Test 11—10 μL Dow Corning® DC1500 silicone antifoam plus 80 μL 'Pluronic® 6100', emulsified together in 50 μL water and tested at 75° C.

TABLE 7

| | Test 1 | Test 2 | Test 3 | Test 4 | Test 5 | Test 6 | Test 7 | Test 8 | Test 9 | Test 10 | Test 11 | Test 12 | Test 13 | Test 14 |
|---|---|---|---|---|---|---|---|---|---|---|---|---|---|---|
| Foam height [mL] | | | | | | | | | | | | | | |
| 1 | 60 | | 25 | 100 | 100 | 100 | 25 | 50 | 100 | 100 | 60 | 30 | 50 | 10 |
| 2 | 75 | | 60 | 100 | 100 | 100 | 50 | 75 | 0 | 0 | 100 | 50 | 60 | 50 |
| 3 | 75 | 100 | 75 | 100 | 100 | 100 | 60 | 80 | 0 | 0 | 100 | 75 | 60 | 60 |
| 4 | 100 | 100 | 90 | 100 | 100 | 100 | 75 | 100 | 0 | 0 | 100 | 75 | | 100 |
| Collapse time [seconds] | | | | | | | | | | | | | | |
| 1 | 20 | 120 | 2 | 120 | 60 | 20 | 1 | 3 | 120 | 50 | 41 | 14 | 18 | 1 |
| 2 | 60 | — | 5 | 120 | — | 30 | 4 | 7 | 0 | 0 | 100 | 23 | 25 | 5 |
| 3 | 55 | — | 10 | 120 | — | 23 | 6 | 10 | 0 | 0 | — | 37 | — | 7 |
| 4 | 120 | 0 | 16 | 120 | — | — | 9 | 14 | 0 | 0 | — | 40 | — | 11 |

The foaming tests measure the antifoam activity of the nonaqueous silicone antifoam emulsions according to the invention and of the comparative materials in an aqueous surfactant solution. This antifoam activity is thus in part an assessment of the release of the silicone phase in the aqueous phase. The tests, particularly the set of Tests 4 to 7 carried out on the nonaqueous silicone antifoam emulsion of Example 1, provide evidence of temperature triggered release of the silicone antifoam. At 23° C., the antifoam is ineffective, indicating that it has not been released from the non-aqueous emulsion into the aqueous phase. Even at 40° C. and 63° C. the volume of foam is not controlled, although there is some effect on the collapse time of the foam. At 75° C. the foam volume is controlled and the collapse time is short, indicating that the silicone antifoam has effectively been released into the aqueous phase. A similar effect is seen between Tests 2 and 3.

Tests 12 to 14 show that the silicone antifoam is also released into the aqueous phase effectively at 75° C. from the nonaqueous emulsions of Examples 5, 10 and 12.

The invention claimed is:

1. A non-aqueous silicone emulsion comprising a continuous phase of a polar organic liquid having dispersed therein droplets of an organopolysiloxane, characterized in that an organic wax, which has a melting point in the range 40 to 100° C. and is sparingly soluble in the polar organic liquid at 25° C., is dispersed in the polar organic liquid continuous phase as a network of interconnected particles which stabilises the organopolysiloxane droplets in emulsion in the polar organic liquid.

2. A non-aqueous silicone emulsion obtainable by the following steps:
   (i) preparing a dispersion of organic wax particles in a polar organic liquid wherein the wax is dispersed in the polar organic liquid continuous phase as a network of interconnected particles, and
   (ii) mixing a liquid organopolysiloxane into the dispersion with sufficient shear that the median organopolysiloxane droplet size is less than 0.5 mm.

3. The non-aqueous silicone emulsion according to claim 1, characterised in that the polar organic liquid continuous phase comprises a polyether.

4. The non-aqueous silicone emulsion according to claim 1, characterised in that the wax is a fatty acid triglyceride.

5. The non-aqueous silicone emulsion according to claim 1, characterised in that the wax is soluble in the polar organic liquid continuous phase at a temperature above the melting point of the wax particles.

6. The non-aqueous silicone emulsion according to claim 1, characterised in that the wax is present at 1 to 10% by weight of the emulsion and the organopolysiloxane is present at 5 to 20% by weight of the emulsion.

7. The non-aqueous silicone emulsion according to claim 1, characterised in that the wax particles dispersed in the polar organic liquid continuous phase are crystalline.

8. A process for the production of a non-aqueous silicone emulsion comprising (i) preparing a dispersion of an organic wax particles in a polar organic liquid wherein the wax is dispersed in the polar organic liquid continuous phase as a network of interconnected particles, and (ii) mixing a liquid organopolysiloxane into the dispersion with sufficient shear that the median organopolysiloxane droplet size is less than 0.5 mm.

9. The process according to claim 8 characterised in that the organic wax has a melting point in the range 40 to 100° C. and is soluble in the polar organic liquid continuous phase at a temperature above the melting point of the wax but is sparingly soluble in the polar organic liquid at 25° C.

10. The process according to claim 8 characterised in that a solution of the organic wax in the polar organic liquid continuous phase is prepared at a temperature above the melting point of the wax and the dispersion of wax particles as a three-dimensional network in the polar organic liquid is produced by cooling the solution of the organic wax in the polar organic liquid.

11. The process according to claim 10 characterised in that the solution of the organic wax in the polar organic liquid is cooled by mixing it into further polar organic liquid which is at a lower temperature than the solution.

12. The process according to claim 8 characterised in that the dispersion of wax particles as a three-dimensional network in the polar organic liquid is produced by adding the wax to the polar organic liquid in the presence of a crystal habit modifier.

13. The process according to claim 12 characterised in that the crystal habit modifier is a finely divided solid hydrophobic silicaceous material.

14. The process according to claim 2 characterised in that the crystal habit modifier is present in the polar organic liquid at 0.5 to 5% by weight.

15. The process in accordance with claim 8 characterised in that the wax particles dispersed in the polar organic liquid continuous phase are crystalline.

16. A process for the controlled release of a silicone active material from a composition, characterised in the silicone active material as organopolysiloxane is incorporated in a non-aqueous silicone emulsion according to claim 5, the non-aqueous silicone emulsion is added to the composition, and the silicone active material is released by heating the composition to a temperature at which the wax is soluble in the polar organic liquid continuous phase.

17. A process for the controlled release of a silicone active material from a composition, characterised in the silicone active material as organopolysiloxane is incorporated in a non-aqueous silicone emulsion according to claim 1, the non-aqueous silicone emulsion is added to the composition, and the silicone active material is released by shearing the composition to destabilise the emulsion.

18. A triggerable control release composition comprising a non-aqueous silicone emulsion obtainable by the following steps:
   (i) preparing a dispersion of organic wax particles in a polar organic liquid wherein the wax is dispersed in the polar organic liquid continuous phase as a network of interconnected particles, and
   (ii) mixing a liquid organopolysiloxane into the dispersion with sufficient shear that the median organopolysiloxane droplet size is less than 0.5 mm.

19. The triggerable control release composition in accordance with claim 18 characterised in that the release of the liquid organopolysiloxane is triggerable by either:
   (a) heating the composition to a temperature above the melting point of the wax; or
   (b) subjecting the composition to a shear significantly greater than the shear in step (ii) used to emulsify the silicone.

20. The triggerable control release composition in accordance with claim 18 characterised in that the wax particles dispersed in the polar organic liquid continuous phase are crystalline.

* * * * *